(No Model.)

G. MINCH.
BELT COUPLING.

No. 333,422. Patented Dec. 29, 1885.

Witnesses:
E. C. Perkins
W. H. Porter

Inventor:
George Minch
By H. Wooster
atty.

UNITED STATES PATENT OFFICE.

GEORGE MINCH, OF STAMFORD, CONNECTICUT.

BELT-COUPLING.

SPECIFICATION forming part of Letters Patent No. 333,422, dated December 29, 1885.

Application filed June 12, 1885. Serial No. 168,527. (No model.)

*To all whom it may concern:*

Be it known that I, GEORGE MINCH, a citizen of the United States, residing at Stamford, in the county of Fairfield and State of Connecticut, have invented certain new and useful Improvements in Belt-Hooks; and I do hereby declare the following to be a full, clear, and exact description of the invention, such as will enable others skilled in the art to which it appertains to make and use the same.

My invention has for its object to provide a hook or clasp for joining the ends of belts, which shall be economical in cost, easy of attachment and detachment when it is desired to change belts or to shorten an old one, and which shall be so durable that it may be used for a great length of time and upon a number of belts without showing signs of wear. With these ends in view I have devised the simple and novel construction which I will now describe, referring by letters to the accompanying drawings, forming part of this specification, in which—

Figure 1:
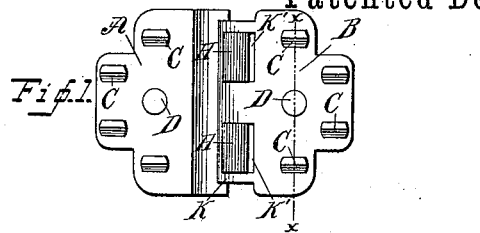
Figure 2:
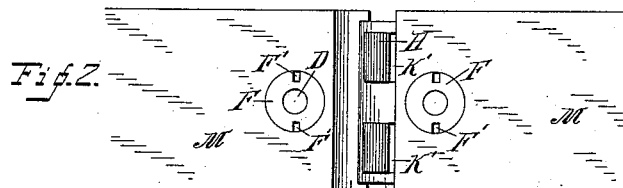
Figure 3:
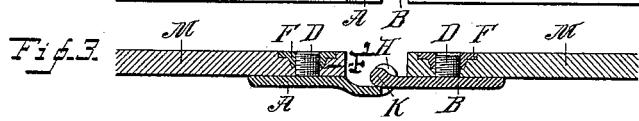
Figure 4:
Figure 5:
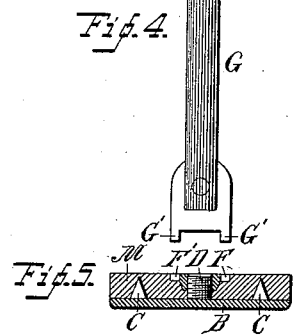
Figure 6:
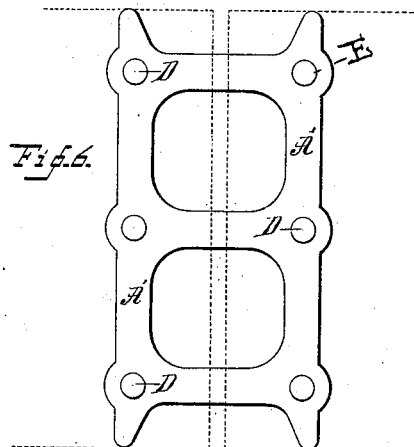
Figure 7:
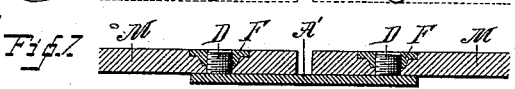

Figure 1 is a reversed plan view of my improved belt-hook detached; Fig. 2, a similar view when in use upon a belt; Fig. 3, a central longitudinal section, as in Fig. 2; Fig. 4, a view of the detaching-key; Fig. 5, a section on the line *x x* in Fig. 1, with the belt added; Fig. 6, a plan view illustrating a modification, and Fig. 7 a section of the modification corresponding with the section of the other form in Fig. 3.

Similar letters indicate the same parts in all the figures.

A and B represent plates adapted for attachment at the ends of the belt M. Both plates are provided with prongs C, adapted to be forced into the belt, and with screw-threaded studs D, which pass through holes E in the belt and are engaged upon the opposite side by nuts F, which are forced down into the leather of the belt, so that in use they lie about even with the surface thereof, upon its inner side. The nuts are provided with notches F' at their outer edges, which are engaged by corresponding bits, G', upon a key, G, whereby the nuts are forced down into the belt. Any other simple means of forcing down the nuts may be used, if preferred.

In order to give a long bearing upon the screw-threaded studs, the nuts are provided with tapering lips F², which extend down upon the stud and compress the material of the belt outward, but without tearing it.

H represents hooks at the outer end of plate A. The metal of the plate curves outward slightly, then inward again to form the hooks, the under sides of which, however, do not project downward far enough to come in contact with the pulleys over which the belt is run. Any number of hooks may be used, depending, of course, upon the width of the belt. The edge of plate B is made thicker than the remainder of the plate, as shown at K, to give additional strength at the point of greatest strain, and openings K' are made through the plate just back of the thickened portion, through which the hooks are passed to join the two ends of the belt, the edge K being rounded, as shown, to provide a smooth bearing for the hooks.

As indicated in Figs. 1, 2, and 3, plates A and B cannot be detached when they lie horizontal to each other, and it is not until they are turned nearly to a right angle with each other that they can be separated, thus rendering it absolutely impossible for them to become separated while in use.

My improved belt-hook is applied as follows: Having cut the belt to the right length, holes are punched in the leather to receive studs D, prongs C are forced into the leather, and nuts F turned down upon the studs until they are flush with the surface of the belt. Prongs C are not an essential feature, and may or may not be used, their purpose being to steady the plates and prevent them from moving about. When it is desired to shorten the belt, it is simply necessary to turn off one nut, which permits the plate to be removed from the belt. The belt may then be shortened as much as may be necessary and the plate again attached in the same manner.

The joint in the coupling formed by the hooks upon one plate and openings in the other is likewise not an essential feature in my improved belt-hook. When used upon wide belts, or upon any belts running upon large pulleys, the modified form illustrated in Figs. 6 and 7 may be used. In this form the coupling is wholly done away with, likewise the prongs C. A single plate, A', of any suitable shape and size, is used instead of two plates, and each end of the plate is provided with a sufficient number of screw-threaded studs to hold the belt firmly. The number required will of course depend upon the width of the belt. This form is applied in the same manner as the other form. Sufficient holes are punched in each end of the belt to receive the corresponding studs upon one end of the belt-hook, the manner of the application being clearly illustrated in Fig. 6, in which the belt is shown in dotted lines. It will of course be understood that the details of construction are subject to considerable variation without departing from the spirit of my invention.

I claim—

1. In a belt-hook, a plate or plates having screw-threaded studs adapted to engage the ends of the belt, and nuts on the other side of the belt provided with tapering lips which engage the studs, whereby the leather of the belt is compressed outward without tearing it.

2. In a belt-hook, a plate, A, having a screw-threaded stud adapted to engage the belt, and hooks H at its forward end, in combination with a plate, B, having a similar stud and openings at its forward end to receive said hooks, and nuts F, which engage said studs and are provided with notches, whereby they are engaged to force them down into the belt.

3. Plate A, having stud D, prongs C, and hooks H at its forward end, in combination with plate B, having a similar stud and prongs, thickened edge K, and openings K', and nuts F, which engage the studs.

In testimony whereof I affix my signature in presence of two witnesses.

GEORGE MINCH.

Witnesses:
A. M. WOOSTER,
A. B. FAIRCHILD.